United States Patent
Deighton

(10) Patent No.: US 9,620,790 B2
(45) Date of Patent: Apr. 11, 2017

(54) METHOD FOR DISMANTLING A BATTERY CELL USING FLUID JETS

(71) Applicant: Energizer Brands, LLC, St. Louis, MO (US)

(72) Inventor: Thomas N Deighton, Brentwood, CA (US)

(73) Assignee: Energizer Brands, LLC, St. Louis, MO (US)

(*) Notice: Subject to any disclaimer, the term of this patent is extended or adjusted under 35 U.S.C. 154(b) by 101 days.

(21) Appl. No.: 14/492,256

(22) Filed: Sep. 22, 2014

(65) Prior Publication Data

US 2015/0118940 A1 Apr. 30, 2015

Related U.S. Application Data

(60) Provisional application No. 61/896,260, filed on Oct. 28, 2013.

(51) Int. Cl.
| | |
|---|---|
| *B24B 1/00* | (2006.01) |
| *H01M 6/52* | (2006.01) |
| *B24C 1/04* | (2006.01) |
| *B24C 9/00* | (2006.01) |
| *H01M 10/54* | (2006.01) |

(52) U.S. Cl.
CPC ............... *H01M 6/52* (2013.01); *B24C 1/045* (2013.01); *B24C 9/006* (2013.01); *H01M 10/54* (2013.01); *Y02P 70/179* (2015.11); *Y02W 30/84* (2015.05)

(58) Field of Classification Search
USPC .................. 451/40, 75, 87, 90, 91
See application file for complete search history.

(56) References Cited

U.S. PATENT DOCUMENTS

| | | | |
|---|---|---|---|
| 3,892,563 A | 7/1975 | LaPoint | |
| 5,882,811 A | 3/1999 | Kawakami | |
| 6,329,096 B2 * | 12/2001 | Kawakami | 429/49 |
| 6,524,737 B1 * | 2/2003 | Tanii | C22B 7/005 |
| | | | 429/49 |

(Continued)

FOREIGN PATENT DOCUMENTS

| | | |
|---|---|---|
| AU | 2009200812 A1 | 9/2009 |
| DE | 4018567 A1 | 12/1991 |

(Continued)

OTHER PUBLICATIONS

International Search Report of PCT/US2014/061709 dated Jan. 5, 2015, 4 pages.

(Continued)

*Primary Examiner* — Joseph J Hail
*Assistant Examiner* — Shantese McDonald
(74) *Attorney, Agent, or Firm* — Alston & Bird LLP

(57) ABSTRACT

A method for recycling a plurality of battery cells, the method includes the steps of orienting a plurality of battery cells along a processing path having at least two fluid jets, moving the plurality of battery cells along the processing path proximate the at least two fluid jets, wherein the at least two fluid jets are positioned to cut first and second ends of each of the plurality of battery cells, and cutting the first and second ends of each of the plurality of battery cells with the at least two fluid jets to expose an interior volume of each of the plurality of battery cells.

18 Claims, 6 Drawing Sheets

(56) References Cited

U.S. PATENT DOCUMENTS

| | | | | |
|---|---|---|---|---|
| 2003/0180604 A1* | 9/2003 | Zenger | ................... | C22B 26/12 |
| | | | | 429/49 |
| 2008/0057839 A1* | 3/2008 | Anderson | ............... | B24C 1/045 |
| | | | | 451/91 |
| 2011/0045342 A1 | 2/2011 | Dessirier et al. | | |

FOREIGN PATENT DOCUMENTS

| | | | |
|---|---|---|---|
| DE | 4424825 | A1 | 1/1996 |
| DE | 19842658 | A1 | 4/1999 |
| EP | 0521242 | A2 | 1/1993 |
| EP | 1408575 | A2 | 4/2004 |
| EP | 2182569 | A1 | 5/2010 |
| FR | 2790368 | A1 | 9/2000 |
| JP | 2006073216 | A | 3/2006 |
| WO | 9425167 | A1 | 11/1994 |
| WO | 2005015668 | A1 | 2/2005 |

OTHER PUBLICATIONS

European Patent Office, Communication Pursuant to Article 94(3) EPC for Application No. 14792970.7, Nov. 10, 2016, 4 pages, Germany.

\* cited by examiner

METHOD FOR DISMANTLING A BATTERY CELL USING FLUID JETS

CROSS-REFERENCE TO RELATED APPLICATIONS

This application claims the benefit of U.S. Provisional Application No. 61/896,260, filed Oct. 28, 2013.

FIELD OF THE INVENTION

This invention relates to a process for dismantling a battery cell, particularly bobbin and spiral-wound battery cells, using fluid jets for cutting and dismantling the battery cell.

BACKGROUND

Interest in recycling battery cells and the components of battery cells for reuse has grown due to the broad use of battery cells in various electronic devices and the amount of waste created by spent battery cells. One type of battery cell is an alkaline electrochemical cell that includes a container typically in the form of a cylindrical steel can having top and bottom ends and a cylindrical sidewall extending between the top and bottom ends. Contained within the can is a positive electrode, also referred to as the cathode. Also contained within the can is a negative electrode, also referred to as the anode, with a separator located between the anode and the cathode, and an alkaline electrolyte solution that contacts the anode, cathode and separator. A conductive current collector is inserted into the anode active material. A collector and seal assembly, which typically includes an annular polymeric seal, an inner metal cover, the current collector, and an outer cover, provides closure to the top end of the steel can to seal closed the steel can.

Conventional methods of dismantling batteries include using saw blades, abrasive wheels, or knives to cut away the top and/or bottom ends of the can. These mechanical cutting means displace significant amounts of battery material due to the kerf of the cutting means. This displaced material may cause battery material to build up upon mechanical components of the cutting mechanism, which hinders the ongoing process of dismantling without stoppage. Dismantling mechanisms typically are stopped so that accumulation of battery material can be removed, or so that the cutting mechanism can be replaced. The mechanical cutting means is also prone to wear, breakage and other failure modes. This wear and breakage can make dismantling large quantities of batteries (thousands/millions) difficult due to the frequency of repairing and/or replacing mechanical parts. The use of blades to disassemble batteries also requires that the battery be fully discharged before cutting. If not discharged, the anode material is in a substantially viscous state which may readily adhere to mechanical parts while being dismantled. The fully discharged battery has an anode that is substantially solid and may be more amenable to mechanical cutting.

Other current methods of battery disassembly include the use of solvents to break apart the various components of the battery cells for subsequent capture. Methods that require the use of solvents may also include cutting at least a portion of the battery cell to expose the internal components of the battery cell, thereby resulting in the same issues noted above as to mechanical cutting means used in disassembly of battery cells.

It is desirable to disassemble large quantities of battery cells using a method that requires minimal and cost effective maintenance and replacement of parts that also captures a maximum amount of battery material for processing and ultimate recycling. Further, a method that is applicable to cell constructions (e.g., bobbin, spirally-wound, etc.), cell sizes (e.g., AA, AAA, C, D, etc.) and battery chemistries (e.g., alkaline, lithium, rechargeable, etc.) commonly utilized in consumer batteries would be welcome.

SUMMARY

The above advantages are provided by a method of dismantling battery cells using one or more fluid jets according to the present invention.

According to a first aspect of the present invention is a method for dismantling a battery for subsequent recycling. The method includes positioning a battery proximate at least one fluid jet. The method also includes removing first and second ends of the battery using the at least one fluid jet to expose an interior portion of the battery. Embodiments of the first aspect of the invention can include any one or a combination of the following features:
  the method includes positioning the battery proximate a fluid gun and removing at least the anode basket and anode material from the interior of the battery using a fluid gun, and capturing at least the anode material;
  the at least one fluid jet and the fluid gun deliver a liquid media;
  the fluid media comprises at least one abrasive material;
  the fluid media comprises water;
  the fluid media comprises a mineral oil solution;
  the at least one fluid jet delivers the liquid media at a first pressure, and the fluid gun delivers the liquid media at a second pressure, wherein the first pressure is greater than the second pressure;
  the at least one fluid jet comprises a first fluid jet configured to cut one of the first and second ends of the battery, and a second fluid jet configured to cut the other of the first and second ends of the battery;
  the method includes the step of removing at least a portion of a cathode ring from the interior of the battery using the fluid gun, and capturing the at least a portion of the cathode ring;
  the anode material and the at least a portion of the cathode ring are captured separately;
  the battery is free of being discharged before the step of removing the first and second ends of the battery;
  the method includes the steps of recirculating the fluid media delivered by the at least one fluid jet and the fluid gun through a fluid media path, and filtering the liquid media within the fluid media path.

A second aspect of the present invention is a method for dismantling a plurality of batteries for recycling, the method including positioning a plurality of batteries, each having an interior volume, proximate first and second fluid jets; cutting each of the plurality of batteries at first and second ends using the first and second fluid jets; and removing the first and second ends of each of the plurality of batteries, wherein the interior volume of each of the plurality of batteries is exposed.

Embodiments of the second aspect of the invention can include any one or a combination of the following features:
  the method includes the steps of separating at least an anode basket and anode material from the interior volume of each of the plurality of batteries using at least one fluid gun, and collecting at least the anode material from each of the plurality of batteries;
a liquid media is delivered through the first and second fluid jets and the at least one fluid gun;
the fluid media includes at least one abrasive material;
the liquid media comprises water;
the liquid media comprises a mineral oil solution;
the first and second fluid jets deliver the liquid media at a first pressure, and the at least one fluid gun delivers the liquid media at a second pressure, wherein the first pressure is greater than the second pressure;
the method includes the steps of removing at least a portion of a cathode ring from the interior volume of each of the plurality of batteries using the at least one fluid gun, and capturing the at least a portion of the cathode ring;
the anode material and the at least a portion of the cathode ring are captured separately;
the plurality of batteries is free of being discharged before the step of removing the first and second ends of each of the plurality of batteries;
the method includes the steps of recirculating the liquid media delivered by the first and second fluid jets and the at least one fluid gun through a fluid media path, and filtering the liquid media within the fluid media path;
the step of removing the first and second ends of each of the plurality of batteries includes the additional step of sorting a plurality of batteries based upon cell type into pluralities of assorted battery cells;
the at least one fluid gun includes a plurality of fluid guns, wherein each of the plurality of fluid guns is configured to separate at least the anode basket and anode material from the interior volume of each of the respective plurality of assorted battery cells.

A further aspect of the present invention is a method for recycling a plurality of battery cells. The method includes orienting a plurality of battery cells along a processing path having at least two fluid jets. The method also includes moving the plurality of battery cells along the processing path proximate the at least two fluid jets, wherein the at least two fluid jets are positioned to cut first and second ends of each of the plurality of battery cells. Further, the method includes cutting the first and second ends of each of the plurality of battery cells with the at least two fluid jets to expose an interior volume of each of the plurality of battery cells.

Embodiments of this further aspect of the invention can include any one or a combination of the following features:
the method includes the steps of moving the plurality of battery cells along the processing path, wherein the processing path comprises one or more fluid guns, and positioning each of the plurality of battery cells proximate at least one of the one or more fluid guns, wherein each of the one or more of the fluid guns is positioned to remove at least the anode basket and anode material from the interior volume of the battery cell, removing at least the anode basket and anode material from the internal volume of each of the plurality of battery cells using the one or more fluid guns and capturing at least the anode material;
a liquid media is delivered through the at least two fluid jets and the one or more fluid guns;
the fluid media includes at least one abrasive material;
the liquid media comprises water;
the liquid media comprises a mineral oil solution;
the first and second fluid jets deliver the liquid media at a first pressure, and the one or more fluid guns deliver the liquid media at a second pressure, wherein the first pressure is greater than the second pressure;
the method further includes the steps of removing at least a portion of a cathode ring from the interior volume of each of the plurality of battery cells using the one or more fluid guns and capturing the at least a portion of the cathode ring;
the anode material and the at least a portion of the cathode ring are captured separately;
each of the plurality of battery cells is free of being discharged before the step of cutting the first and second ends of each of the plurality of battery cells;
the method further including the steps of recirculating the liquid media delivered by the first and second fluid jets and the one or more fluid guns through a fluid media path and filtering the liquid media within the fluid media path;
the method also including the step of sorting the plurality of battery cells into pluralities of sorted battery cells, wherein the processing path includes a plurality of sorted paths corresponding to each of the pluralities of sorted battery cells;
each of the plurality of battery cells are sorted into the pluralities of sorted battery cells before the step of cutting the first and second ends of each of the plurality of battery cells;
each of the plurality of battery cells are sorted into the pluralities of sorted battery cells after the step of cutting the first and second ends of each of the plurality of battery cells;
the one or more fluid guns comprises a plurality of fluid guns, wherein each of the plurality of fluid guns corresponds to one of the plurality of sorted paths.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.) under ambient conditions.

DETAILED DESCRIPTION

Figure 1:
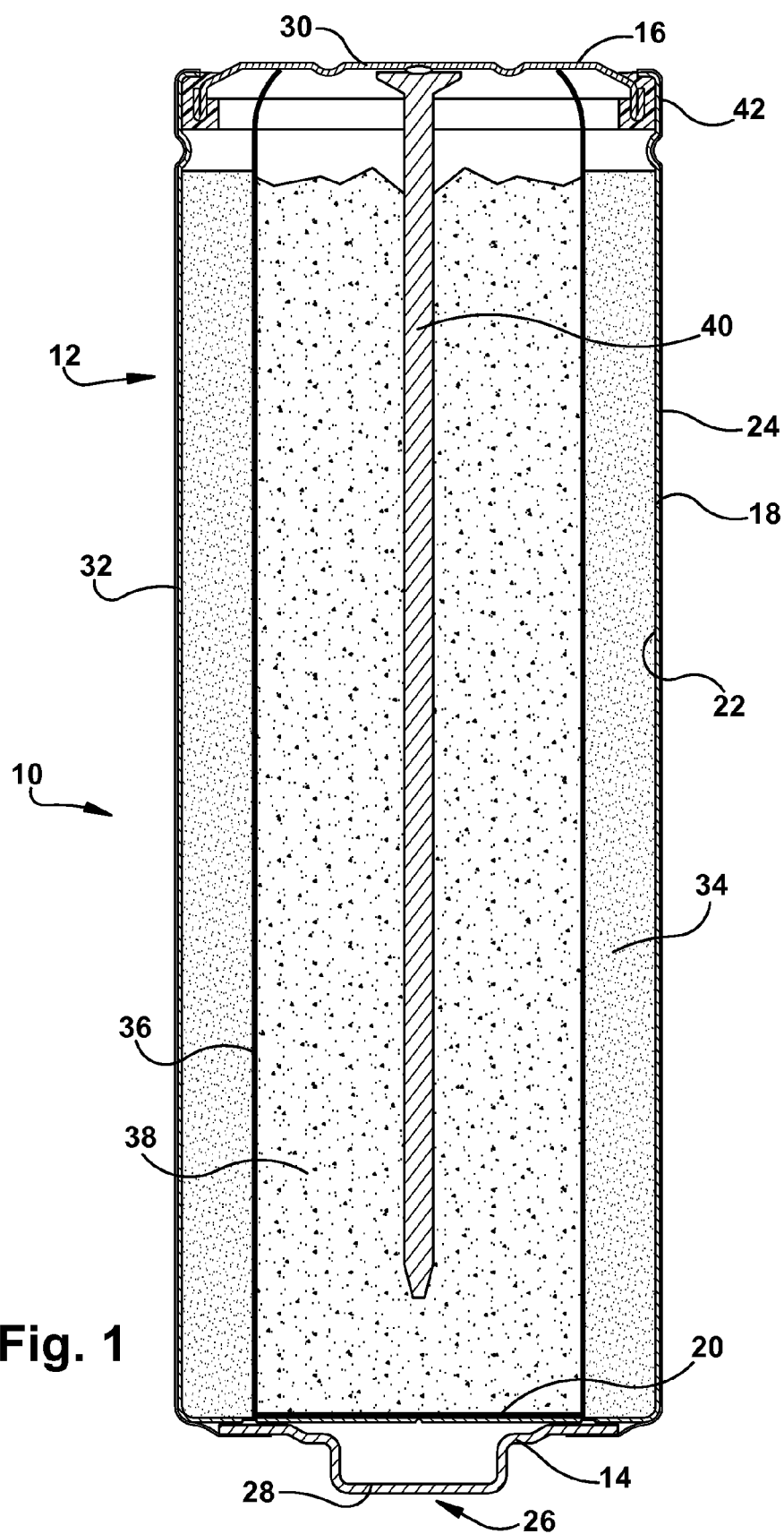
FIG. 1 is a cross-sectional view of one embodiment of a battery cell before being dismantled.

Referring to FIG. 1, a cylindrical alkaline electrochemical cell 10 (battery) is generally shown that may include a cylindrical alkaline cell, such as an AA-size bobbin-style battery cell 10, according to one example. It should be appreciated that the present method may be employed for other shapes, sizes and electrode configurations of battery cells 10 according to the teachings of the present invention.

The electrochemical battery cell 10 includes a container generally shown as a cylindrical steel can 12 having a first or top end 14, a second or bottom end 16, and a cylindrical side wall 18 extending between the top and bottom ends 14, 16. The second or bottom end 16 of the steel can 12 has a closed end wall 20 integrally formed, in the embodiment shown, during formation of the steel can 12. This may be achieved by a conventional can 12 formation process, such as a deep drawing process. Alternately, the closed end wall 20 may be connected, e.g., welded, to the bottom end 16 of the cylindrical side wall 18 to form a can 12.

The can 12 and its closed end wall 20 may be made of any suitable metal that can be formed into a desired shape and can be adapted to seal the contents within the battery cell 10. In the embodiment shown, the steel can 12 also functions as the cathode current collector, and therefore has good electrical conductivity. The internal surface 22 of the steel can 12 may be coated with a material, such as graphite. The external surface 24 of the steel can 12 may be plated to provide corrosion resistance, high electrical conductivity, and an attractive appearance. According to one embodiment, the internal surface 22 of the steel can 12 may be plated with metal(s) and heat-treated to improve these characteristics. According to one embodiment, the side wall 18 and closed bottom end 16 of the steel can 12 may have a thickness in the range of about 0.005 inch to 0.014 inch (0.13 milliliters to 0.36 millimeters) thick. The can 12, side wall 18 and bottom end 16 may have the same or different thicknesses, coatings and/or platings.

Welded onto the exterior surface of the closed bottom end 16 of the steel can 12 is a positive contact terminal 26 or cover that is formed of plated steel, such as a nickel plated steel. The positive contact terminal 26 has a protruding nubbin 28 (i.e., protrusion), defined by side wall 18, at its center region, which serves as the positive contact terminal 26 of a battery cell 10. Assembled onto the opposite top end 14 of the steel can 12 is a negative contact terminal 30 or cover which forms the negative contact terminal 30 of the battery cell 10. The positive and negative contact terminals 30 are made of electrically conductive metal and form the respective positive and negative electrical terminals.

A jacket 32 is formed about the exterior surface of the steel can 12, and is further formed over the peripheral edge of the closed bottom end 16 of the can 12. The jacket 32 may include an adhesive layer such as a metalized, plastic film label.

Disposed within the steel can 12 is a cathode 34, also referred to as the positive electrode, which may be formed of a mixture of manganese dioxide ($MnO_2$), graphite, potassium hydroxide (KOH) solution, and additives, according to one embodiment. The cathode 34 may be impact molded in the steel can 12 into the shape of a cylindrical ring against the internal surface 22 of the side wall 18 of the can 12. This involves compacting the cathode 34 mixture within the steel can 12. Alternately, the cathode 34 may be ring molded by inserting one or more preformed molded rings of cathode 34 mixture into the steel can 12. Other cathode materials may be used, and the cathode may be coated, adhered to or otherwise physically attached to another component, such as a separate current collector and/or the separator itself.

A separator or anode basket 36 is disposed within the steel can 12 against the interior surface of the cathode 34. The separator comprising anode basket 36 may be formed of a non-woven fabric that prevents migration of solid particles in the battery cell 10, and these terms (i.e., separator and anode basket) are used synonymously herein. Also, other separator materials may be used, including but not limited porous and microporous polymeric sheets, ceramics, woven materials or any other material or combination of materials that are compatible with the electrodes and electrolyte and that create an ionically permeable, physical barrier between the electrodes.

An anode 38, also referred to as the negative electrode, is also disposed within the steel can 12 inside of the separator 36. An alkaline electrolyte is further disposed within the steel can 12 and in contact with each of the cathode 34, separator/anode basket 36, and anode 38. The anode 38 may be formed of zinc powder, a gelling agent, and additives, according to one embodiment. Other anode materials may be used, and the anode may be coated, adhered to or otherwise physically attached to another component, such as a separate current collector and/or the separator itself.

While a bobbin-type battery cell 10 construction is shown and described herein, it should be appreciated that the electrochemical battery cell 10 can otherwise be configured. For example, a jellyroll (spiral wound) electrode and separator cell 10 construction more commonly associated with lithium and rechargeable battery types may be used. Also, for the methods described herein, it may be possible to pre-sort the battery cells based on indications of such constructions (e.g., as indicated on the label and/or as shown by imaging techniques or other indirect measurement, such as mass) or other characteristics to increase the efficiency, reliability or efficacy of the process.

A collector and seal assembly is assembled onto the first or open end of the steel can 12 for closing the open end of the steel can 12. The collector and seal assembly shown includes a current collector, an annular polymeric (e.g., nylon) seal 42, and a negative contact terminal 30. The current collector, which may include a brass or other type of conductive nail having an elongated body and enlarged head, is disposed in contact with the anode 38 and negative contact terminal 30. The negative contact terminal 30 extends across the open end of the steel can 12 and engages a nylon seal 42. The seal 42 may include a ring-shaped polymeric seal 42 having a generally J-shape cross-section, according to one embodiment. The assembly of the seal 42 may include disposing the seal 42 in the open end of the steel can 12 on top of a bead formed radially inward on the side wall 18 of the can 12, or alternately in a flared opening of the can 12, and crimping the upper end of the steel can 12 inwardly and over the outer periphery of the seal 42 and negative contact terminal 30 to compress the seal 42 against the bead. The polymeric seal 42 is thereby compressed between the peripheral edge of the negative contact terminal 30 and the upper end wall 20 of the steel can 12.

It should be appreciated that the negative contact terminal 30 is electrically insulated from the steel can 12 by way of the intermediate polymeric seal 42. The resulting collector and seal assembly shown provides a low volume closure to the open end of the steel can 12. It should further be appreciated that other closure assemblies may be employed to seal closed the open end of the steel can 12.

According to one example, the electrochemical battery cell 10 is a AA-size battery cell 10 employing a low carbon, aluminum killed, SAE 1006 or equivalent steel with an inside can 12 plating of nickel and cobalt, and an outside plating of nickel. The steel substrate comprises maximums of 0.08 weight percent carbon, 0.45 weight percent manganese, 0.025 weight percent phosphorous and 0.02 weight percent sulfur; and the grain size of the steel is ASTM 8 to 12. The steel strip may have the following mechanical properties: 45,000 pound maximum yield strength, 60,000 pound ultimate strength, 25 percent minimum elongation in 2 inches (50.8 mm), and 82 maximum Rockwell 15T hardness. The can 12 has a manufactured overall height of approximately 1.3 inches, and an outside diameter of approximately 0.549 inches.

Figure 2:
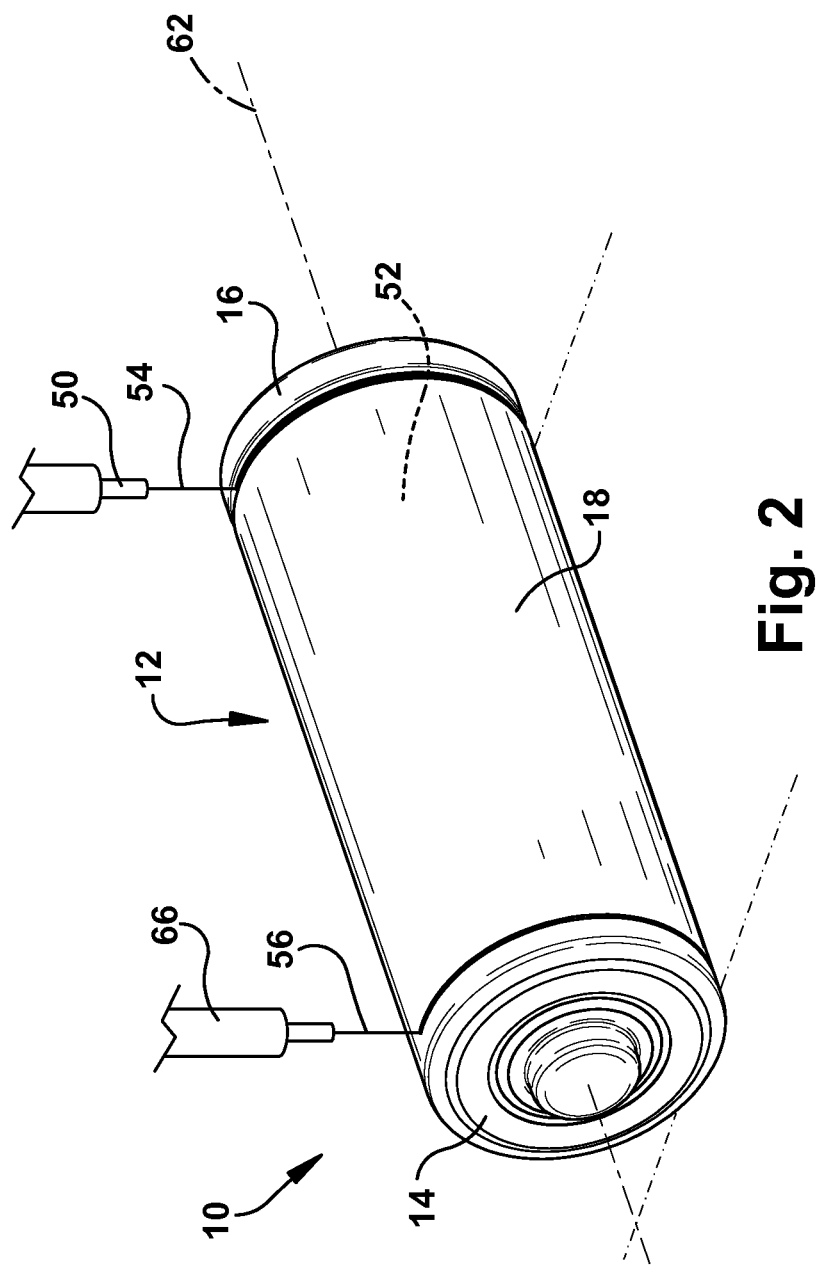
FIG. 2 is a schematic perspective view of a battery where first and second ends of the battery are being cut by fluid jets.
Figure 3:
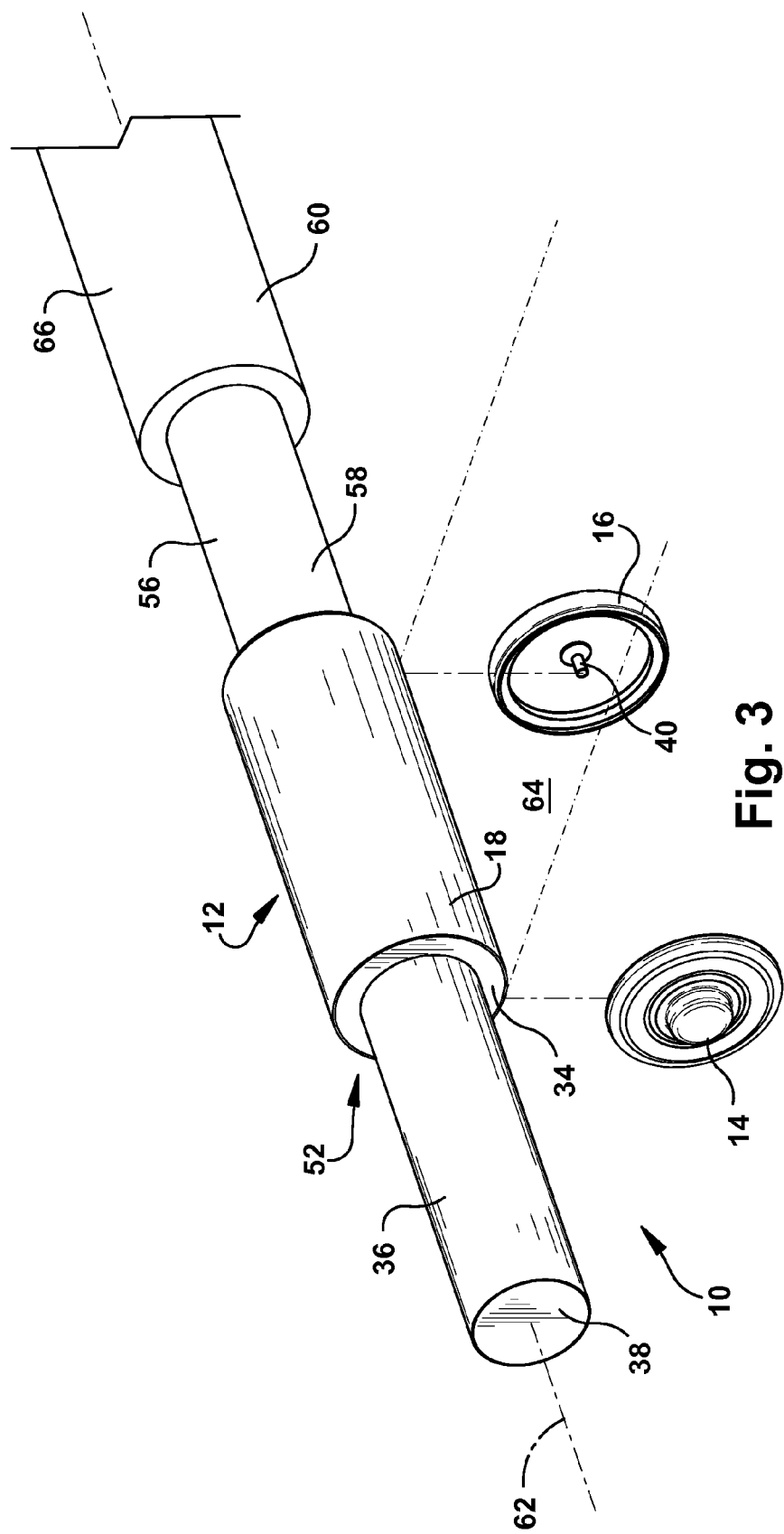
FIG. 3 is a schematic perspective view of the battery of FIG. 2 in the process of being dismantled by a fluid gun.
Figure 4:
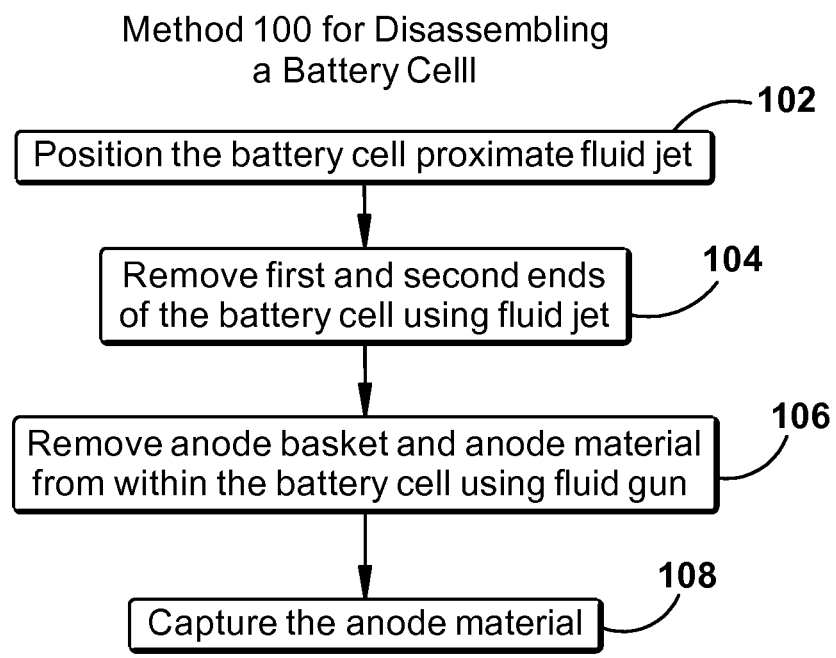
FIG. 4 is a flow chart diagram showing one embodiment of the method for dismantling battery cells.

Having described the battery cell 10 generally, a method 100 for dismantling a battery cell 10, as described above, is disclosed below. Referring to FIGS. 2-4, one embodiment of the method 100 includes step 102 of positioning the battery cell 10 proximate at least one fluid jet 50. The method 100 also includes the step 104 of removing first and second ends of the battery cell 10 using the at least one fluid jet 50, thereby exposing an interior 52 of the battery cell 10. According to this method 100, the fluid jet 50 is used as a cutting tool to remove the first and second ends of the battery cell 10. The fluid jet 50 utilizes a small concentrated fluid stream 54 of high-pressure fluid that is directed to the first and second ends of the battery cell 10, such that the high-pressure fluid is projected from the fluid jet 50 at approximately 60,000 psi. It should be understood that fluid streams 54 having greater or lesser psi can be used depending upon the exact configuration of the fluid jet 50 and the battery cells 10 to be disassembled. The type of fluid jet 50 used for this method is similar to those manufactured by Ward Jet, Model No. AS-6100. In various embodiments, a 100 HP pump is sufficient to create fluid streams 54 having the necessary force and speed to be used in conjunction with the fluid jets 50 and fluid guns 60.

The type of fluid used in the fluid jet 50 can vary depending upon the battery cell 10 to be disassembled and can include materials that include, but are not limited to, gaseous materials, combination gas and liquid materials, liquids and the like. Liquid media 56 can be used as the fluid, which can include, but is not limited to, water, mineral oil solution, solvents, or other similar liquid materials. To assist in the cutting operation, various abrasive materials 58 can be added to the liquid media 56 to increase the cutting performance of the fluid jet 50. These abrasives 58 include those that are similar to those manufactured by GMA Garnet Abrasive. These abrasives 58, when added to the fluid media, may require a fluid stream 54 having a slightly larger diameter. The abrasives 58 can also increase the cutting speed of the fluid jets 50, and thereby increase the overall processing speed of battery cell 10 disassembly.

In the various embodiments of the method, because a fluid media is used as the cutting tool for cutting the first and second ends of the battery cell 10, discharging the battery cell 10 prior to cutting is not necessary. Prior to discharge, the anode material 38 inside the battery cell 10 typically has a viscous consistency that is not amenable to mechanical cutting tools such as blades, rotary discs, and the like. The viscous anode 38 will tend to stick or otherwise adhere to the mechanical cutting apparatus and other mechanical aspects of the cutting mechanism. Because the method described herein uses fluid jets 50 instead of mechanical cutting mechanisms, the viscous consistency of the anode 38 of the battery cell 10 does not tend to adhere to cutting machinery since the fluid jets 50 can be placed distal from the battery cell 10 and project a cutting fluid stream 54 from this distal position. Therefore, the anode material 38 does not substantially interfere with the cutting process of the fluid jets 50.

Additionally, the use of fluid jets 50 minimizes airborne dust and cut material that may be thrown from the battery cell 10 as a result of using a conventional cutting mechanism such as blades or rotary discs. In the various embodiments, the fluid jet 50 can direct the liquid media 56 in a stream 54 having a cutting width or kerf of approximately a millimeter or less, such that very little material is removed from the battery cell 10 during the cutting process. Additionally, the liquid media 56 serves to substantially capture and retain the battery cell 10 material that is removed during the cutting process.

Referring again to FIGS. 3-4, the method 100 also includes the step 106 of positioning the battery cell 10 proximate a fluid gun 60, such that the fluid gun 60 is directed at the exposed interior 52 of the battery cell 10 and positioned substantially parallel with a longitudinal axis 62 of the battery cell 10. This step of the method 100 also includes removing at least the anode basket 36 and anode material 38 from the interior 52 of the battery cell 10 using the fluid gun 60. Step 108 of the method 100 includes capturing at least the anode material 38 removed from the battery cell 10 by the fluid gun 60.

As illustrated in FIG. 3, the fluid gun 60 directs a stream 54 of the liquid media 56 into the interior 52 of the battery cell 10 that has been exposed after the fluid jets 50 have removed the first and second ends of the battery cell 10. The fluid gun 60 directs a stream 54 of the fluid media at approximately 100-200 psi, in a larger diameter stream 54 than that of the fluid jet 50. The diameter of the stream 54 directed by the fluid gun 60 can vary depending upon the type of battery cell 10 to be disassembled. When disassembling an alkaline "D" battery cell 10, which has a 1.3" overall diameter, the diameter of the stream 54 emitted from the fluid gun 60 can be approximately 0.5" diameter. The diameter of the stream 54 used to disassemble a smaller battery cell 10, such as a "AA" or "AAA" can be smaller, due to the smaller diameter of the battery cell 10. It is also contemplated that the fluid stream 54 from the fluid gun 60 can be larger where the cathode 34 is also to be removed by the fluid gun 60.

In various embodiments, the fluid jet 50 is configured to deliver the liquid media 56 at a first pressure. The fluid gun 60 is configured to deliver the liquid media 56 at a second pressure, wherein the first pressure is greater than the second pressure. In this manner, the fluid jets 50 are further configured to direct a fine, high-pressure stream 54 of the liquid media 56 to the first and second ends of the battery cell 10 to cut through the can 12 and interior material of the battery cell 10 to separate the first and second ends from the battery cell 10. The fluid gun 60 is configured to direct a lower pressure stream 54 at a greater diameter to provide a pushing force that forces the anode 38 and anode basket 36 apart from the cathode 34 and out of the interior 52 portion of the battery cell 10.

The fluid jets 50 and fluid guns 60 can be operated by independent systems, each including a dedicated pump to account for the differing fluid pressures from the fluid jets 50 and the fluid guns 60 that are directed at the battery cell 10. These separate systems can also include different liquid media 56. A first liquid media 56 is used by the fluid jets 50 for cutting, and a second liquid media 56 is used by the fluid guns 60 for removing at least the anode material 38 and the anode basket 36. By way of explanation, and not limitation, the cutting operation in a certain disassembly path 64 may be more efficient where the abrasive 58 is included in the first liquid media 56. Alternatively, the removal of the anode 38 in the same dissembly path may be accomplished more effectively where no abrasive 58 is present in the second fluid media. The first and second fluid media may also be different in these separate fluid media delivery systems.

As illustrated in FIG. 3, the fluid gun 60 directs the fluid stream 54 at the exposed interior 52 of the battery cell 10, thereby pushing at least the anode 38 and the anode basket 36 out from the interior 52 of the battery cell 10. In this manner, the anode 38 and anode basket 36 are separated from the cathode 34 of the battery cell 10, so that the anode 38 can be collected. In various embodiments, the fluid gun 60 can also be used to remove the cathode 34, or a portion of the cathode 34, from the interior 52 of the battery cell 10 so that the cathode 34 can also be collected and similarly recycled. In various embodiments, the cathode 34 and the anode 38 can be collected together and subsequently separated, or, in alternate embodiments, the anode 38 and cathode 34 can be separated through separate processes and individually collected.

As illustrated in FIGS. 2 and 3, the fluid jets 50 and fluid gun 60 can be stationary mechanisms, wherein the battery cell 10 is directed proximate the fluid jets 50 and fluid gun 60 for dismantling the battery cell 10. In such an embodiment, a substantially continuous line of battery cells 10 can be directed along a disassembly path 64, such that the fluid jets 50 can be positioned in one portion of the path for removal of the first and second ends of each of the battery cells 10 to be disassembled. At another portion of the disassembly path, the fluid gun 60 or fluid guns 60 can be positioned to remove the anode 38, the anode basket 36, and/or at least a portion of the cathode 34 during disassembly.

In various alternate embodiments, the fluid jet 50 and/or the fluid gun 60 can be movable along the disassembly path 64. In such an embodiment, a plurality of fluid jets 50 and fluid guns 60 can be operated within a single disassembly path 64, such that the disassembly path 64 can move greater numbers of battery cells 10 through the disassembly path 64 in a given time period.

Because the fluid jets 50 are configured to cut through the first and second ends of each battery cell 10 placed within the disassembly path 64, it is necessary that the fluid jets 50 move at either a different speed than the battery cells 10 to be cut, a different direction, or both, such that the fluid jet 50 can be moved perpendicularly through the first and second ends of the battery cell 10 to accomplish the cutting operation required of the method. The fluid jets 50 can be moved linearly along the disassembly path 64 to cut the battery cells 10. The fluid jets 50 can also be rotated about a spindle-type mechanism such that the radial movement of the fluid jets 50 and the cutting streams 54 serve to cut the top and bottom ends 14, 16 of the battery cells 10.

Because the fluid gun 60 is configured to direct a fluid stream 54 along the longitudinal axis 62 of the battery cell 10, the fluid gun 60 may be configured to move at or near the same speed, and in the same direction, as the battery cells 10 moving along the disassembly path 64. This co-directional movement substantially provides the fluid gun 60 enough time to fully remove the anode 38 and anode basket 36 from the interior 52 of the battery cell 10. In such an embodiment, a plurality of fluid guns 60 are necessary to accommodate the removal of the anode 38 and anode basket 36 from the plurality of battery cells 10 placed within the disassembly path 64. Separate fluid guns 60 can also be configured along the disassembly path 64, wherein one fluid gun 60 is configured to remove the anode 38 and anode basket 36 and another fluid gun 60 is configured to remove the cathode 34. In such an embodiment, these fluid guns 60 may operate at different fluid pressures, or have differing fluid media, depending upon the specific application of the method, the force of fluid stream 54 necessary to remove the battery cell 10 components, and the type of battery cell 10, among other factors.

Referring again to FIGS. 2 and 3, the type of liquid media 56 used can depend upon the type of battery cell 10 to be disassembled. The use of water as the liquid media 56 can be used for alkaline-type battery cells 10. Alternatively, for lithium and other spiral wound-type battery cells 10, water is less preferred because of the various chemical reactions that can be caused by the combination of water and the interior portions of a spiral-wound battery cell 10. In such embodiments where lithium and spiral-type battery cells 10 are disassembled, such a method may include the use of a water-free solution, mineral oil, mineral spirits, solvents, or other water-free fluids, to prevent these chemical reactions.

In each of these embodiments, the use of the fluid media in the fluid jet 50 and fluid gun 60 provides a self-cleaning means to accomplish the battery cell 10 disassembly as described above. The use of the liquid media 56 is also beneficial to keep any zinc material extracted with the anode 38 thoroughly wet to prevent the potential of certain zinc reactions that can produce spontaneous exothermic reactions. Moreover, the use of the liquid media 56, as discussed above, allows the battery cells 10 to be disassembled without first discharging the battery cells 10, thereby eliminating a step necessary in dismantling battery cells 10 under current processes and saving time, money and resources.

In various embodiments, the liquid media 56 used in the fluid jets 50 and the fluid gun 60 is recycled for use in cutting subsequent battery cells 10 placed within the disassembly path 64. In such embodiments, the liquid media 56 delivered by the first and second fluid jets 50 and the fluid gun 60 is recirculated through a fluid media path 66, wherein the liquid media 56 is filtered within the fluid media path 66 and delivered back to the fluid jets 50 and fluid gun 60 for reuse. Such filters may be necessary to remove battery cell 10 material that is removed during the disassembly process, such as the material collected by the fluid jets 50 while cutting first and second ends of each of the battery cells 10. It is contemplated that the filters used to remove various particulate matter from the liquid media 56 are to be periodically replaced or cleaned when the filter used in the fluid media path 66 becomes substantially saturated by the particulate matter filtered from the liquid media 56.

In various embodiments, the fluid media path 66 can contain a plurality of filters and is configured such that filters can be replaced during operation of the disassembly method, without stopping the disassembly process. In this manner, where one filter is removed and replaced, one or more backup filters continue to filter the liquid media 56 for recirculation back to the fluid jets 50 and fluid gun 60. Separate fluid media paths 66, each having an independent filtration system can be used where more than one fluid media is used to perform the disassembly of batteries according to the embodiments of the method.

Figure 5:
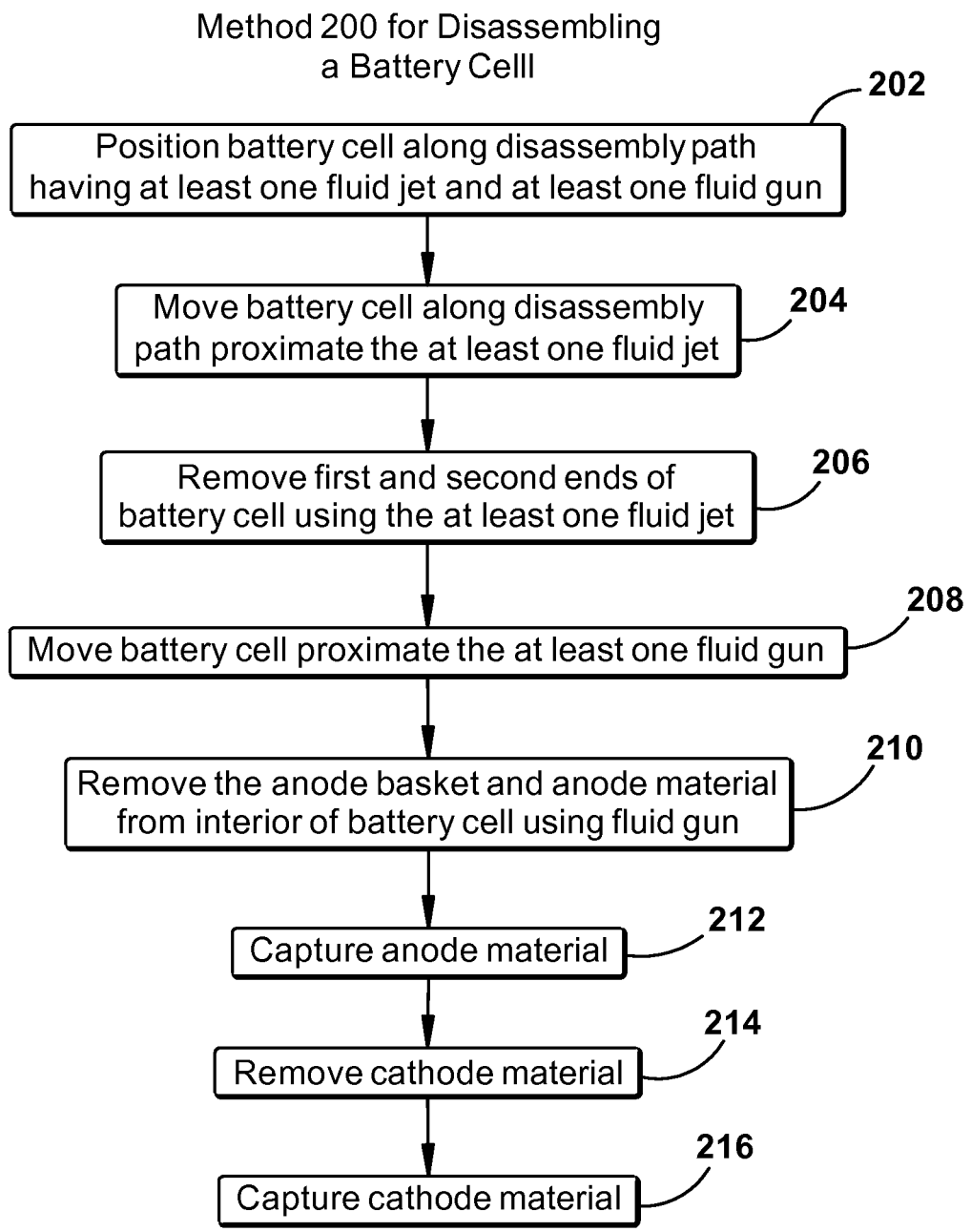
FIG. 5 is a flow chart diagram showing an alternate embodiment of the method for dismantling battery cells.

Referring now to FIG. 5, method 200 includes the step 202 of positioning a battery cell 10 along a disassembly path 64 having at least one fluid jet 50 and at least one fluid gun 60. The method also includes step 204 of moving the battery cell 10 along the disassembly path 64 proximate the at least one fluid jet 50. In such an embodiment, the battery cells 10 are moved under the fluid jet 50 to accomplish the next step 206 in the method 200 of removing the first and second ends of the battery cell 10 using at least one fluid jet 50. According to step 208 of the method, the battery cell 10 is moved proximate the at least one fluid gun 60. According to step 210, the anode basket 36 and anode material 38 are removed from the interior 52 of the battery cell 10 using the fluid gun 60. According to step 212 of the method, the anode material 38 is captured.

It is contemplated that this method can also include the step 214 of removing the cathode material 34 from the interior 52 of the battery cell 10. This step can be accomplished by, as discussed above, directing the fluid gun 60 at the interior 52 of the battery cell 10 to remove at least a portion of the cathode material 34. Alternatively, the can 12 of the battery cell 10 with the cathode material 34 can be disposed within a known solvent, wherein the solvent breaks down the cathode material 34 and separates the cathode material 34 from the can 12 of the battery cell 10. According to step 216 of the method, that portion of the cathode material 34 removed from the can 12 is captured for subsequent processing.

In various embodiments, the method can be limited to the step of positioning the battery cell 10 proximate the fluid jets 50, and removing the first and second ends of each of the battery cells 10 placed under the fluid jets 50. Once this step is accomplished, each of the battery cells 10 with the exposed interior 52 can be delivered to an alternate facility for removal of at least a portion of the interior 52 of the battery cell 10, where at least a portion of this interior material can be recycled.

Figure 6:
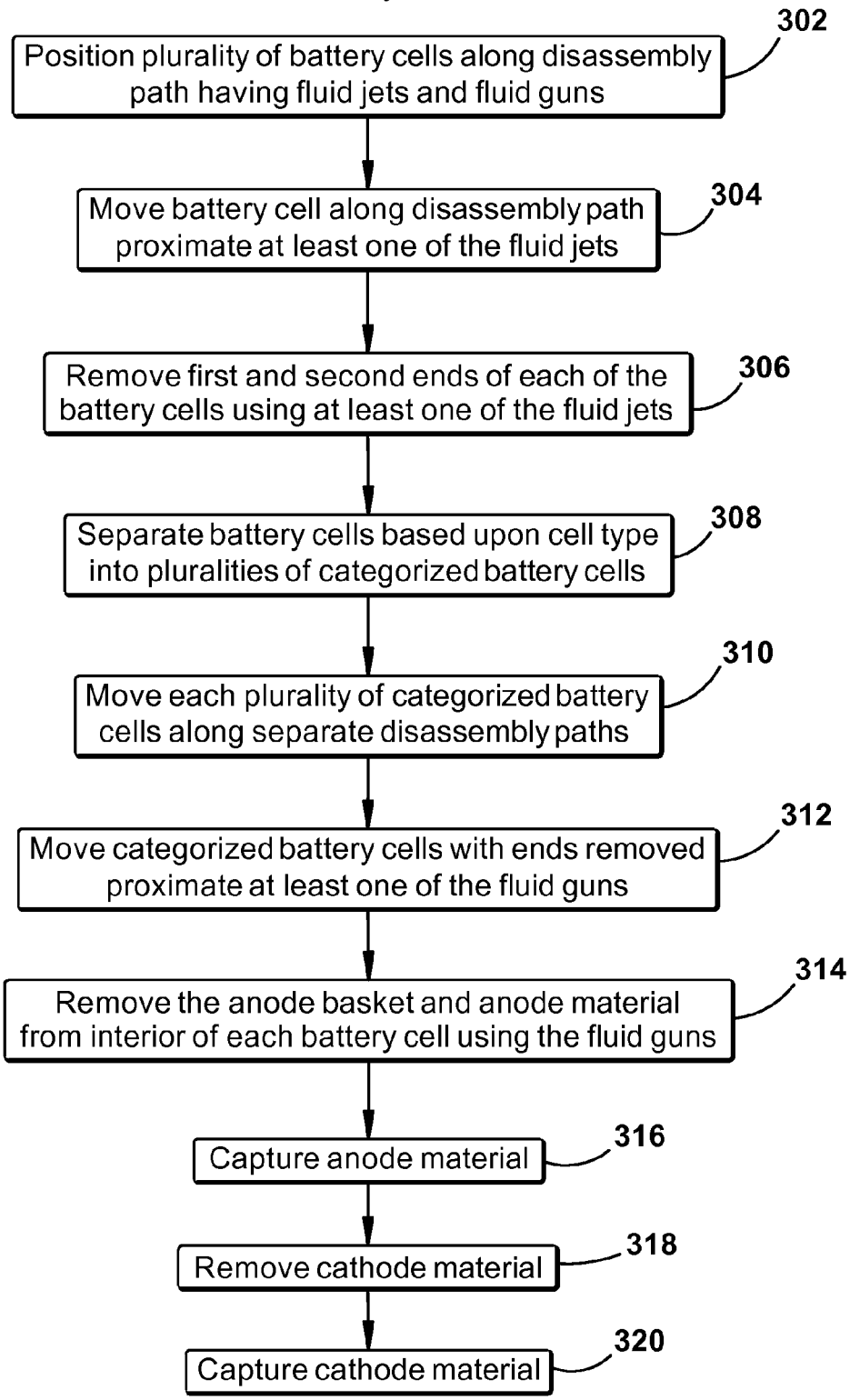
FIG. 6 is a flow chart diagram showing an alternate embodiment of the method for dismantling a battery cell.

Referring now to FIG. 6, a method 300 for dismantling a plurality of battery cells 10 includes step 302 of orienting a plurality of battery cells 10 along a processing path having at least two fluid jets 50. According to this method, a plurality of battery cells 10 can be collected and disposed within one or more holding containers, wherein a delivery mechanism such as a belt, rollers, conveyor or other similar delivery mechanism removes the battery cells 10 from the storage bin, and orients the battery cells 10 upon the processing path for positioning under the fluid jets 50. In various embodiments, the battery cells 10 can be pre-sorted into separate holding containers based upon various characteristics, such as battery cell 10 type, size, etc.

Step 304 of the method includes moving the plurality of battery cells 10 along the processing path proximate the at least two fluid jets 50, wherein the at least two fluid jets 50 are positioned to cut first and second ends of each of the plurality of battery cells 10. Step 306 of the method includes cutting the first and second ends of each of the plurality of battery cells 10 with the at least two fluid jets 50 in order to expose an interior 52 of each of the plurality of battery cells 10. According to such a method, the speed at which the plurality of battery cells 10 move along the disassembly path 64 can depend upon various factors, that include, but are not limited to, the size of the battery cells 10, the number of fluid jets 50 disposed along the disassembly path 64, the type of liquid media 56 used, whether abrasive material 58 is included in the fluid media, among other factors.

According to step 308 of the method, after the first and second ends of each of the plurality of battery cells 10 are removed, the battery cells 10 are separated based upon battery cell 10 type into pluralities of categorized battery cells 10. According to this step, the battery cells 10 can be separated based upon battery cell 10 size (AAA, AA, C or D), battery cell 10 construction (bobbin-style, spiral wound, etc.) or battery cell 10 geometry (cylindrical, rectilinear, etc.). The separation of the battery cells 10 can be accomplished through visual or digital scanning, various openings in the processing path that are configured to allow only certain sized battery cells 10 through corresponding openings, assessing weight, or other categorization methods. Once the battery cells 10 are separated into the pluralities of categorized battery cells 10, each of the pluralities of categorized battery cells 10 is moved along a separate disassembly path 64, where each category of battery cells 10 is separately processed. It should be contemplated that, as discussed above, the categorization of the individual battery cells 10 can alternatively occur before the first and second ends of the battery cells 10 are removed by the fluid jets 50.

According to step 310 of the method, each of the categorized battery cells 10 is moved along separate disassembly paths 64, and, according to step 312, the categorized battery cells 10, with first and second ends removed, are moved proximate at least one of the fluid guns 60. According to step 314 of the method, the anode basket 36 and anode material 38 from the interior 52 of each of the categorized battery cells 10 is removed using at least one fluid gun 60. According to step 316, the anode material 38 is captured, as described above. According to step 318, the cathode material 34 can be removed, wherein under step 320, the cathode material 34 can be captured. As discussed above, the cathode material 34 can be removed by one or more of the liquid guns or through the use of solvents, or other means that can include, but are not limited to, grinding, scraping, crushing, or other method that can be used to separate the cathode 34 from the can 12.

According to various embodiments, the above method can be used to cut approximately 30 battery cells 10/minute. It is contemplated that additional numbers of battery cells 10 can be processed where additional jets are added, or where smaller types of battery cells 10 are being processed. Further optimization of one or more the parameters and components contemplated herein may allow for even more efficient processing rates.

In various alternate embodiments, an operable post can be used to extract the anode 38 and anode basket 36 from the interior 52 of the battery cell 10 after the first and second ends have been removed. In such an embodiment, the operable post presses into the interior 52 of the battery cell 10 along the longitudinal axis 62 of the battery cell 10 and forces the anode 38 and anode basket 36 apart from the cathode 34 and out of the interior 52 of the battery cell 10. In such an embodiment, the fluid gun 60 may not be necessary, and the liquid media 56 would only be used by the fluid jets 50 for cutting the first and second ends of the battery cell 10.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A method for dismantling batteries for recycling, the method comprising the steps of:
    positioning at least one battery proximate at least one fluid jet;
    removing first and second ends of the at least one battery using the at least one fluid jet, thereby exposing an interior volume of the at least one battery;
    positioning the at least one battery proximate a fluid gun; and
    at least one of: i) removing at least a portion of anode material from the interior volume using the fluid gun and capturing at least a portion of the anode material; and ii) removing at least a portion of a cathode ring from the interior volume of the at least one battery using the fluid gun and capturing the at least a portion of the cathode ring.

2. The method of claim 1, further comprising removing the anode material from an anode basket recovered from the battery.

3. The method of claim 1, further comprising causing the at least one fluid jet and the fluid gun to deliver a liquid media.

4. The method of claim 3, further comprising providing at least one abrasive material to the liquid media.

5. The method of claim 3, wherein the liquid media comprises water.

6. The method of claim 3, wherein the liquid media comprises a mineral oil solution.

7. The method of claim 3, further comprising delivering via the at least one fluid jet the liquid media at a first pressure, and delivering via the fluid gun the liquid media at a second pressure, wherein the first pressure is greater than the second pressure.

8. The method of claim 3, further comprising:
recirculating the liquid media delivered by the at least one fluid jet and the fluid gun through a fluid media path; and
filtering the liquid media within the fluid media path.

9. The method of claim 1, further comprising separately capturing the anode material and the at least a portion of the cathode ring.

10. The method of claim 1, further comprising cutting one of the first and second ends of the at least one battery with a first fluid jet and cutting the other of the first and second ends of the at least one battery with a second fluid jet.

11. The method of claim 1, wherein the at least one battery has not been discharged before removing the first and second ends of the at least one battery.

12. The method of claim 1, further comprising sequentially or simultaneously removing the first and second ends of a plurality of batteries.

13. The method of claim 12, further comprising:
separating at least an anode basket from the interior volume of each of the plurality of batteries using at least one fluid gun;
collecting at least the anode material from each of the plurality of batteries;
removing at least a portion of a cathode ring from the interior volume of each of the plurality of batteries using the at least one fluid gun;
capturing the at least a portion of the cathode ring; and
wherein the anode material and the at least a portion of the cathode ring from each battery are captured separately.

14. The method of claim 12, wherein removing the first and second ends of each of the plurality of batteries further includes sorting the plurality of batteries based upon a cell type into pluralities of sorted battery cells.

15. A method for recycling a plurality of battery cells, the method comprising:
orienting a plurality of battery cells along a processing path having at least two fluid jets;
moving the plurality of battery cells along the processing path proximate the at least two fluid jets, wherein the at least two fluid jets are positioned to cut first and second ends of each of the plurality of battery cells; and
cutting the first and second ends of each of the plurality of battery cells with the at least two fluid jets to expose an interior volume of each of the plurality of battery cells.

16. The method of claim 15, further comprising:
moving the plurality of battery cells along the processing path proximate to one or more fluid guns;
positioning each of the plurality of battery cells proximate at least one of the one or more fluid guns, wherein each of the one or more fluid guns is positioned to remove at least a portion of an anode basket and anode material from the interior volume of each of the plurality of battery cells;
removing at least the anode basket and anode material from the internal volume of each of the plurality battery cells using the one or more fluid guns; and
capturing at least the anode material.

17. The method of claim 16, further comprises delivering a liquid media through the at least two fluid jets and the one or more fluid guns.

18. The method of claim 15, further comprising:
sorting the plurality of battery cells into pluralities of sorted battery cells arranged in a plurality of sorted paths corresponding to each of the pluralities of sorted battery cells.

* * * * *